US009218760B2

(12) United States Patent
Lee et al.

(10) Patent No.: US 9,218,760 B2
(45) Date of Patent: Dec. 22, 2015

(54) DRIVING CIRCUIT FOR LIQUID CRYSTAL DISPLAY DEVICE AND METHOD FOR DRIVING THE SAME

(75) Inventors: Song-Jae Lee, Gimpo-si (KR); Young-Ho Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 10 days.

(21) Appl. No.: 13/314,367

(22) Filed: Dec. 8, 2011

(65) Prior Publication Data

US 2012/0146966 A1 Jun. 14, 2012

(30) Foreign Application Priority Data

Dec. 14, 2010 (KR) ........................ 10-2010-0127922

(51) Int. Cl.
*G06F 3/038* (2013.01)
*G09G 3/20* (2006.01)

(52) U.S. Cl.
CPC .......... *G09G 3/2096* (2013.01); *G09G 2310/08* (2013.01)

(58) Field of Classification Search
USPC .......... 324/760.1, 760.01; 345/100, 102, 104, 345/173, 174, 204, 211, 215, 589, 690, 345/75.1, 75.2, 76, 87, 89, 94, 98; 315/169.4, 209
See application file for complete search history.

(56) References Cited

U.S. PATENT DOCUMENTS 8,542,179 B2 * 9/2013 Shibata ................ G09G 3/3677 345/100
2007/0001980 A1 * 1/2007 Bae ...................... G09G 3/3611 345/98
2007/0029418 A1 2/2007 Jakobi et al.
2007/0229418 A1 10/2007 Yun et al.
2008/0001896 A1 1/2008 Okamura
2008/0165099 A1 * 7/2008 Cho ..................... G09G 3/3406 345/87
2010/0053146 A1 3/2010 Han et al.

FOREIGN PATENT DOCUMENTS

| | | | |
|---|---|---|---|
| CN | 1877689 | A | 12/2006 |
| CN | 100369105 | C | 2/2008 |
| CN | 101436371 | A | 5/2009 |
| JP | 2002-244610 | A | 8/2002 |
| KR | 1020030029413 | A | 4/2003 |

(Continued)

OTHER PUBLICATIONS

UK Search Report issued in the corresponding UK Patent Application No. 1121451.7 dated Apr. 10, 2012.

(Continued)

*Primary Examiner* — Kathy Wang-Hurst
*Assistant Examiner* — Douglas Wilson
(74) *Attorney, Agent, or Firm* — Morgan, Lewis & Bockius LLP

(57) ABSTRACT

A driving circuit for a liquid crystal display device includes a liquid crystal panel comprising a plurality of pixel areas to display an image; a data driver configured to drive data lines of the liquid crystal panel; a gate driver configured to drive gate lines of the liquid crystal panel; and a timing controller configured to generate an internal enable signal in an initial driving where an external power is applied, to control the gate and data drivers, and configured to control the gate and data drivers based on synchronization signals, after controlling the driving of the gate driver to be stopped for one frame period when at least one synchronization signals are input from outside.

8 Claims, 4 Drawing Sheets

(56) References Cited

FOREIGN PATENT DOCUMENTS

| | | | |
|---|---|---|---|
| KR | 10-2007-0002955 | A | 1/2007 |
| KR | 10-2010-0022783 | A | 3/2010 |

OTHER PUBLICATIONS

Office Action dated Jan. 2, 2014 from the State Intellectual Property Office of the People's Republic of China in counterpart Chinese application No. 201110430706.8.

Office Action dated May 30, 2013 from the Korean Intellectual Property Office in counterpart Korean Application No. 10-2010-0127922.

Examination Statement dated Feb. 27, 2014 from the Taiwan Advance Patent & Trademark Office in counterpart Taiwanese application No. 100145673.

* cited by examiner

DRIVING CIRCUIT FOR LIQUID CRYSTAL DISPLAY DEVICE AND METHOD FOR DRIVING THE SAME

CROSS REFERENCE TO RELATED APPLICATION

This application claims the benefit of the Patent Korean Application No. 10-2010-0127922, filed on Dec. 14, 2010, which is hereby incorporated by reference as if fully set forth herein.

BACKGROUND OF THE DISCLOSURE

1. Field of the Disclosure

The present invention relates to a liquid crystal display device, more particularly, to a driving circuit for a liquid crystal display device which can prevent errors generated in an initial driving where an external power is applied, to enhance reliability of the liquid crystal display, and a method for driving the same.

2. Discussion of the Related Art

Flat panel displays which are grasping notices recently include liquid crystal displays, field emission displays, plasma display panels, and light emitting displays. Out of them, the liquid crystal displays have been actively applied to notebook computers, desktop monitors and mobile terminals, because of good resolution, good color displaying and a good image quality.

Such a liquid crystal display device adjusts a light transmittance of liquid crystal by using an electric field and the liquid crystal display device then displays an image. For that, the liquid crystal display device includes a liquid crystal panel having a plurality of pixels to display an image, a driving circuit for driving the liquid crystal panel and a backlight unit for projecting a light to the liquid crystal panel.

The liquid crystal panel includes the plurality of the pixels to adjust a transmittance of the light projected from the backlight unit and it then displays a desired image. Here, each of the pixels receives a data voltage from each of data lines in response to a gate driving voltage supplied via each of gate lines. After that, each of the pixels charges a difference voltage between the supplied data voltage and a common voltage such that arrangement of liquid crystal particles may be modulated enough to adjust the light transmittance.

The driving circuit arranges image data input from the outside by at least one horizontal line. After that, the driving circuit coverts the horizontal line unit arranged image data into an analog data voltage and it sequentially supplies the converted analog data voltage to each of the pixels provided in the liquid crystal panel by an every horizontal line period unit.

In an initial driving where an external power is applied thereto, such the liquid crystal display device generates an enable-signal to use in displaying the image more stably before displaying the image. In other words, once the power is on by the external power applied to the liquid crystal display device, the internally-self-generated enable-signal is used to display the image on the liquid crystal panel stably. After that, when synchronization signals are supplied from the outside, the synchronization signals is used to display the image on the liquid crystal panel.

However, while displaying the images based on the self-generated-enable-signal, the images based on the self-generated-enable-signal converts into the images based on the external synchronization signals to display the images based on the external synchronization signals. In the case, a start-signal for noticing a start of every frame might be duplicated, only to generate a problem that a single image is dupliatedly displayed on a single screen. In other words, as shown in FIGS. 1*a* and 1*b*, an identical image happens to be re-displayed before an entire image of a single frame is not displayed in an initial driving of the conventional liquid crystal display device. Because of this error, reliability of the conventional liquid crystal display could result in deteriorating disadvantageously.

SUMMARY OF THE DISCLOSURE

Accordingly, the present invention is directed to a driving circuit for a liquid crystal display device and a method for driving the same.

An object of the present invention is to provide a driving circuit for a liquid crystal display device and a method for driving the same, which can prevent errors generated in an initial driving where an external power is applied, to enhance reliability of the liquid crystal display device.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a driving circuit for a liquid crystal display device includes a liquid crystal panel comprising a plurality of pixel areas to display an image; a data driver configured to drive data lines of the liquid crystal panel; a gate driver configured to drive gate lines of the liquid crystal panel; and a timing controller configured to generate an internal enable signal in an initial driving where an external power is applied, to control the gate and data drivers, and configured to control the gate and data drivers based on synchronization signals, after controlling the driving of the gate driver to be stopped for one frame period when at least one synchronization signals are input from outside.

The timing controller may modulate/generate a first gate control signal for controlling the gate driver in an initial driving where an external power is input, and generates a second gate control signal for controlling the gate driver when the synchronization signals are input, wherein the second gate control signal makes the gate driver not output gate-on voltages for one frame period.

The timing controller may include an internal signal generating unit configured to generate the internal enable signal in itself; an image processing unit configured to supply the arranged image data to the data driver by arranging image data based on at least one of the internal enable signals and the synchronization signals; a data control signal generating unit configured to generate a first date control signal based on the internal enable signal, and configured to generate a second data control signal based on at least one of the synchronization signals input from outside when at least one of the synchronization signals are input from the outside; a gate control signal generating unit may be configured to generate a second gate control signal based on the synchronization signals when at least one of the synchronization signals are input, to make the gate driver not output gate-on voltages for one frame period, after generating a first gate control signal based on the internal enable signal to sequentially supply gate-on voltages to each of the gate lines based on the first gate control signal.

The gate control signal generating unit may generate/output a second gate control signal, the second gate control signal includes a gate output enable signal maintaining high or low for one frame period, to make the gate driver not output the gate-on voltages for one frame period.

The internal signal generating unit may generate a switching signal for noticing the input of the synchronization signals, and supply the switching signal to the gate control signal generating unit, together with the synchronization signals, and then the gate control signal generating unit may generate the second gate control signal includes a gate output enable signal maintaining high or low for one frame period, to make the gate driver not output the gate-on voltages for one frame period.

In another aspect of the present invention, a method for driving a liquid crystal display device includes driving data lines of a liquid crystal panel by using a data driver; driving gate lines of the liquid crystal panel by using a gate driver; controlling the gate and data drivers based on synchronization signals, after controlling the gate and data drivers based on an internal enable signal generated thereby in an initial driving where an external power is applied and controlling the driving of the gate driver to be stopped for one frame period when at least one synchronization signals are input from outside.

The gate and data drivers controlling step may modulate/generate a first gate control signal for controlling the gate driver in an initial driving where an external power is input, and generates a second gate control signal for controlling the gate driver when the synchronization signals are input, wherein the second gate control signal makes the gate driver not output gate-on voltages for one frame period.

The gate and data drivers controlling step may include generating the internal enable signals in itself; supplying the arranged image data to the data driver by arranging image data based on at least one of the internal enable signals or the synchronization signals; generating/outputting a first data control signal a first date control signal based on the internal enable signals, and generating a second data control signal based on at least one of synchronization signals input from the outside when at least one of the synchronization signals are input from the outside, and generating a second gate control signal based on the synchronization signals when at least one of the synchronization signals are input, to make the gate driver not output gate-on voltages for one frame period, after generating a first gate control signal based on the internal enable signals to sequentially supply gate-on voltages to each of the gate lines based on the first gate control signal.

The second gate control signal may include a gate output enable signal maintaining high or low for one frame period to make the gate driver not output the gate-on voltages for one frame period.

The gate and data drivers controlling step may further include generating a switching signal for noticing the input of the synchronization signals, and supplying the switching signal to the gate control signal generating unit, together with the synchronization signals.

According to the present invention, errors generated in an initial driving where an external power is applied may be prevented. As a result, reliability of the liquid crystal display device may be enhanced more remarkably.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

As follows, a driving circuit for a liquid crystal display device according to an exemplary embodiment of the present invention will be described in detail in reference to the accompanying drawings.

Figure 1A:
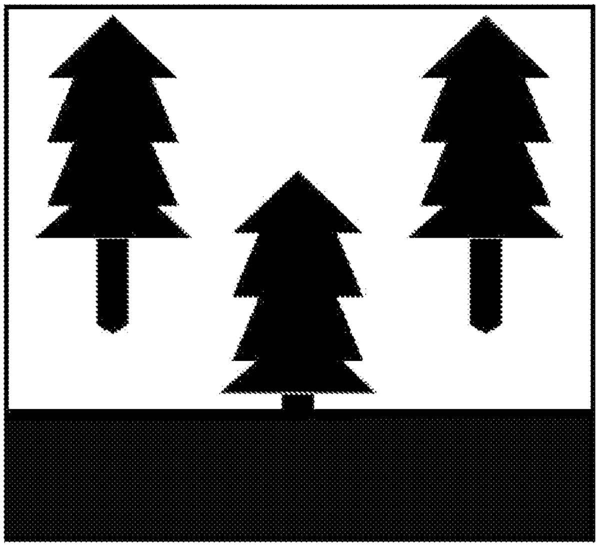
FIG. 1A Related Art
FIGS. 1*a* and 1*b* are diagrams illustrating an error generated by a liquid crystal display according to a prior art.
Figure 1B:
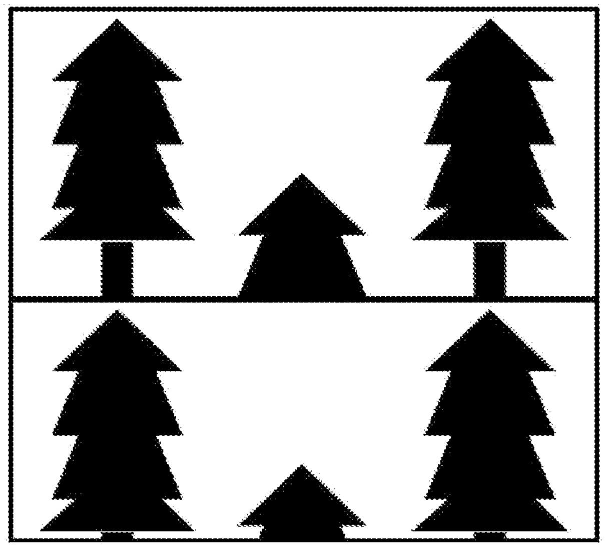
FIG. 1B Related Art
Figure 2:
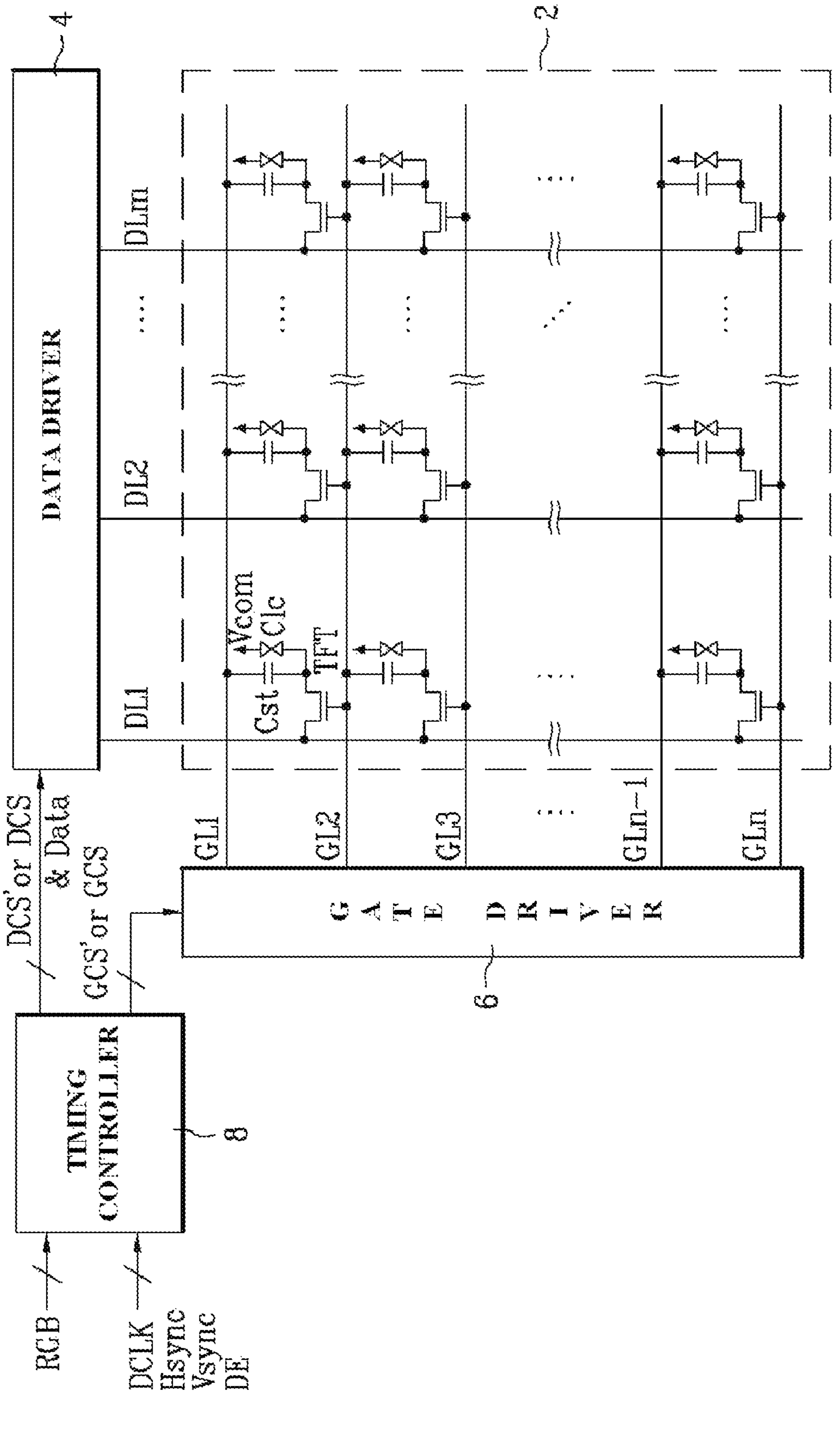
FIG. 2 is a diagram schematically illustrating a configuration of a driving circuit provided in a liquid crystal display device according to an embodiment of the present invention.

FIG. 2 illustrates a configuration of a driving circuit provided in a liquid crystal display device according to an exemplary embodiment of the present invention.

The driving circuit for the liquid crystal display device shown in FIG. 2 includes a liquid crystal panel 2 including a plurality of pixel areas used to display images, a data driver 4 configured to drive data lines (DL1 to DLm) of the liquid crystal panel 2, a gate driver 6 configured to drive gate lines (GL1 to GLn) of the liquid crystal panel 2, a timing controller 8 configured to control the gate and data drivers 6 and 4 based on an enable-signal generated thereby, in an initial driving where an external power is applied, and configured to control the gate and data drivers based on synchronization signals (DCLK, Hsync, Vsync and DE), after controlling the driving of the gate driver 6 to be stopped for one frame period once external synchronization signals (DCLK, Hsync, Vsync and DE) are inputted.

The liquid crystal panel 2 includes a thin film transistor (TFT) formed in each of the pixel areas defined by the gate lines (GL1 to GLn) to the data lines (DL1 to DLm) and a liquid crystal capacitor (Clc) linked with the TFT. The liquid crystal capacitor (Clc) is configured of a pixel electrode connected with the (TFT) and a common electrode opposed with the pixel electrode and a liquid crystal. The thin film transistor (TFT) supplies an image signal transmitted from each of the data lines (DL1 to DLm) to the pixel electrode in response to a scan pulse transmitted from each of the gate lines (GL1 to GLn). The liquid crystal capacitor (Clc) charges a difference voltage between the image signal supplied to the pixel electrode and a common voltage supplied to the common electrode, and it modulates arrangement of liquid crystal particles according to the difference voltage. Because of that, a light transmittance is adjusted and gradation is presented. A storage capacitor (Cst) is connected to the liquid crystal capacitor (Clc) in parallel to maintain the voltage charged by the liquid crystal capacitor (Clc) until the next data signal is supplied. The pixel electrodes are overlapped the former gate line with a dielectric layer therebetween, to form the storage capacitor (Cst). Alternatively, the pixel electrodes are overlapped a storage line with the dielectric layer therebetween, to form the storage capacitor.

The data driver 4 receives image data (Data) arranged by the timing controller 8 and data control signals (DCS' and DCS) from the timing controller 8. After that, the data driver 4 drives each of the data lines (DL1 to DLm) according to the arranged image data (Data) and the data control signals (DCS' and DCS). The arranged data is data arranged to be proper to a driving property of the liquid crystal panel 2 from external image data (RGB). In an initial driving where an external power is input, the data driver 4 receives an initial data control signal (DCS') from the timing controller 8 and it drives each of the data lines (DL1 to DLm) based on the initial data control signal (DCS'). The initial data control signal (DCS') is a control signal generated by the enable-signal generated by the timing controller 8 in itself. After that, once the data control signals (DCS) generated by external synchronization signals (DCLK, Hsync, Vsync and DE) are input to the data driver 4, the data driver 4 drives the data lines (DL1 to DLm) based on the input data control signals (DCS).

The data driver 4 coverts arranged image data (Data) inputted in real-time into analog image data, in other words, image signals, based on source start pulse (SSP) and source shift clock (SSC) of the data control signals (DCS' and DCS). Image signals for a single horizontal line per every single horizontal period where the gate-on signal (or scan pulse) is supplied to each of the gate lines (GL1 to GLn) may be supplied to each of the data lines (DL1 to DLm). At this time, the data driver 4 supplies the image signal to each of the data lines (DL1 to DLm) in response to a source output enable (SOE) signal. Specifically, the data driver 4 latches the arranged image data (Data) inputted according to SSC. After that, the data driver 4 supplies to each of the data lines (DL1 to DLm) the image signals for a single horizontal line per every single horizontal period where the gate-on signal (or scan pulse) is supplied to each of the gate lines (GL1 to GLn) in response to the SOE signal.

The gate driver 6 receives gate control signals (GCS and GCS') from the timing controller 8 and it generates a plurality of gate driving voltages to drive the gate lines (GL1 to GLn) sequentially. Similar to the data driver 4, the gate driver 6 receives an initial gate control signal (GCS') from the timing controller 8 in an initial driving where an external power is input, and it drives the gate lines (GL1 to GLn) sequentially based on the gate control signal (GCS'). Once an external gate control signal (GCS) according to external synchronization signals (DCLK, Hsync, Vsync and DE) is inputted, the gate driver 6 drives the gate lines (GL1 to GLn) based on the input gate control signal (GCS).

The gate driver 6 generates gate-on voltages based on gate start pulse (GSP) and gate shift clock (GSC) of the gate control signals (GCS), and it modulates/outputs the output period, that is, the pulse width. The output gate-on voltages are supplied to the gate lines (GL1 to GLn) sequentially. In addition, the gate driver 6 supplies gate-off voltages for a period where the gate-on voltages are not supplied.

The timing controller 8 generates an enable-signal in itself in the initial driving where an external power is input. The timing controller 8 arranges image data (RGB) input from the outside to be proper to the driving of the liquid crystal panel 2 based on the internal enable-signal, such that the arranged data may be supplied to the data driver 4. At this time, the timing controller 8 generates the initial gate control signal (GCS') and the initial data control signal (DCS') based on the self enable-signal. The generated initial gate and data control signals (GCS' and GCS) are supplied to the gate and data drivers 6 and 4, respectively. Once the external synchronization signals, that is, dot clock (DCLK), a data-enable signal and horizontal and vertical synchronization signals (Hsync and Vsync) are input to the timing controller 8 after that, the timing controller 8 generates the gate and data control signals (GCS and DCS) based on at least one of the synchronization signals. When the gate and data control signals (GCS and DCS) according to the synchronization signals are generated, the timing controller 8 supplies the generated gate and data control signals to the gate and data drivers 6 and 4, instead of the initial gate and data control signals (GCS' and DCS').

In the present invention, once the external synchronization signals (DCLK, Hsync, Vsync and DE) start to be input, the timing controller 8 generates the gate control signal (GCS) to supply it to the gate driver 6. The gate control signal (GCS) makes the gate driver 6 not output the gate-on voltages to each of the gate lines (GL1 to GLn) for one frame period. Thereby, the image signals according to the synchronization signals (DCLK, Hsync, Vsync and DE) may not be displayed on the liquid crystal panel 2 for one frame period. In other words, only image signals according to the initial gate and data control signals (GCS' and DCS') for the former frame are displayed on the liquid crystal panel 2.

Figure 3:
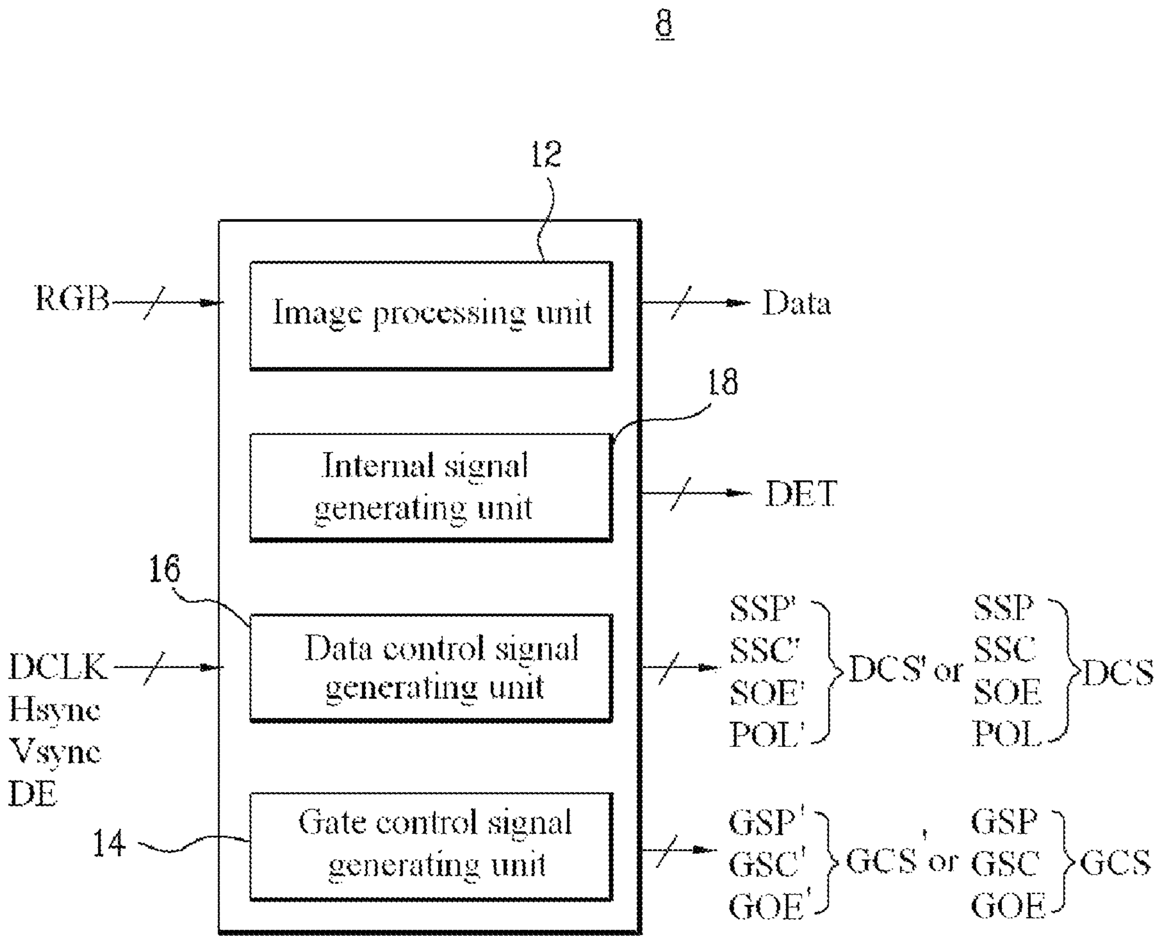
FIG. 3 is a diagram illustrating a configuration of a timing controller shown in FIG. 2.

FIG. 3 illustrates a configuration of the timing controller in detail.

The timing controller 8 shown in FIG. 3 includes an internal signal generating unit 18 configured to generate an internal-enable-signal in itself, an image processing unit 12 configured to arrange the image data (RGB) based on at least one of the internal-enable signals and the synchronization signals (DCLK, Vsync, Hsync and DE) to supply the arranged data to the data driver 4, a data control signal generating unit 16 configured to generate the initial data control signal (DCS') according to the internal-enable signal and then configured to generate the data control signal (DCS) based on at least one synchronization signals (DCLK, Vsync, Hsync and DE) input from the outside, when at least one of synchronization signals are input from the outside, and a gate control signal generating unit 14 configured to generate an initial gate control signal (GCS') to supply gate-on voltages to each of the gate lines (GL1 to GLN) sequentially based on the internal-enable signal and then configured to generate a gate control signal (GCS) based on at least one synchronization signals (DCLK, Vsync, Hsync and DE) from the outside, to make the gate driver 6 not output gate-on voltages for one frame period.

Once an external power is input, the internal signal generating unit 18 generates the internal-enable-signal by using the external power. When at least one of the synchronization signals (DCLK, Hsync, Vsync and DE) starts to be input from the outside, the internal signal generating unit 18 generates a switching signal (DET) for noticing the input of the synchronization signals (DCLK, Hsync, Vsync and DE). At this time, the switching signals (DET), together with the synchronization signals (DCLK, Vsync, Hsync and DE) input from the outside, are supplied to the gate and data control signal generating units 14 and 16, respectively.

In the initial driving where the external power is input, the image processing unit 12 arranges the image data (RGB) to be proper to the driving of the liquid crystal panel 2 based on the internal-enable signal of the internal signal generating unit 18 and it supplies the arranged image data (Data) to the data driver 4. When the at least one of the external synchronization signals (DCLK, Hsync, Vsync and DE), for example, a data enable (DE) signal is input, the image processing unit 12 arranges the image data (RGB) to be proper to the driving of the liquid crystal panel 2 based on the data enable signal (DE) and it supplies the arranged image data (Data) to the data driver 4. While the image processing unit 12 is arranging/outputting the image data (RGB) based on the internal enable signal in the initial driving, the switching signal is input from the internal signal generating unit 18 and the image processing unit 12 then arranges/outputs image data based on the data enable signal (DE).

In the initial driving where the external power is input, the data control signal generating unit 16 generates the initial data control signal (DCS'), that is, an initial SSC' including an initial SOE' signal, SSP' and POL' which is a polar control signal based on the internal-enable signal transmitted from the internal signal generating unit 18. When at least one of external synchronization signals (DCLK, Hsync, Vsync and DE), for example, a data enable signal (DE) and a vertical synchronization signal (Vsync) is input, the data control signal generating unit 16 generates SSC including a SOE signal, SSP and a POL which is a polar control signal based on the at least one of the synchronization signals. At this time, the data control signal generating unit 16 modulates a voltage level of the POL signal according to a preset inversion method of the liquid crystal panel 2 to generate the POL signal. The generated data control signal (DCS) is supplied to the data driver 4. Here, when at least one of the synchronization signals (DCLK, Hsync, Vsync and DE) starts to be input from the outside, a switching signal (DET) for noticing the input of the synchronization signals (DCLK, Hsync, Vsync and DE) is generated by the internal signal generating unit 18. The switching signal (DET), together with the synchronization signals (DCLK, Vsync, Hsync and DE) input from outside, are supplied to the data control signal generating unit 16, and the data control signal generating unit 16 then generates/outputs a data control signal (DCS) based on at least one of the synchronization signals (DCLK, Hsync, Vsync and DE).

In the initial driving where the external power is input, the gate control signal generating unit 14 generates the initial gate control signal (GCS'), that is, GSP' including an initial GOE' signal and GSC' based on the internal enable signal transmitted from the internal signal generating unit 18. When at least one of synchronization signals (DCLK, Hsync, Vsync and DE), for example, a data enable signal (DE) starts to be input, the gate control signal generating unit 14 generates/outputs the gate control signal (GCS), wherein, the gate control signal generating unit 14 generates/outputs a gate output enable (GOE) signal, and maintains the GOE signal high or low for one frame period, to make the gate driver 6 not output gate-on voltages for one frame period. The gate driver 6 adjusts/outputs the pulse width of the gate-on voltages, that is, the output period of the gate-on voltages based on the GOE signal. Because of that, the gate driver 6 may not output the gate-on voltages to the gate lines (GL1 to GLn) for one frame period and image signals transmitted from the external synchronization signals (DCLK, Hsync, Vsync and DE) may not be displayed on the liquid crystal panel 2 for one frame period accordingly. That is, only image signals according to the initial gate and data control signals (GCS' and DCS') of the former frame may be displayed on the liquid crystal panel 2.

In the meanwhile, the gate control signal generating unit 14 generates/outputs the initial gate control signal (GCS') based on the internal enable signal in the initial driving. When at least one of the synchronization signals (DCLK, Hsync, Vsync and DE) starts to be input from the outside, a switching signal (DET) for noticing the input of the synchronization signals (DCLK, Hsync, Vsync and DE) is generated by the internal signal generating unit 18. The switching signal (DET), together with the synchronization signals (DCLK, Vsync, Hsync and DE) input from the outside, are supplied to the gate control signal generating unit 14, and the gate control signal generating unit 14 then generates/outputs the gate control signal (GCS) based on at least one of the synchronization signals (DCLK, Hsync, Hsync and DE). Such the gate control signals (GCS) are signals for controlling a driving timing of the gate driver 6, that is, signals generated to allow the gate driver 6 to supply gate-on voltages to the gate lines (GL1 to GLn).

Figure 4:
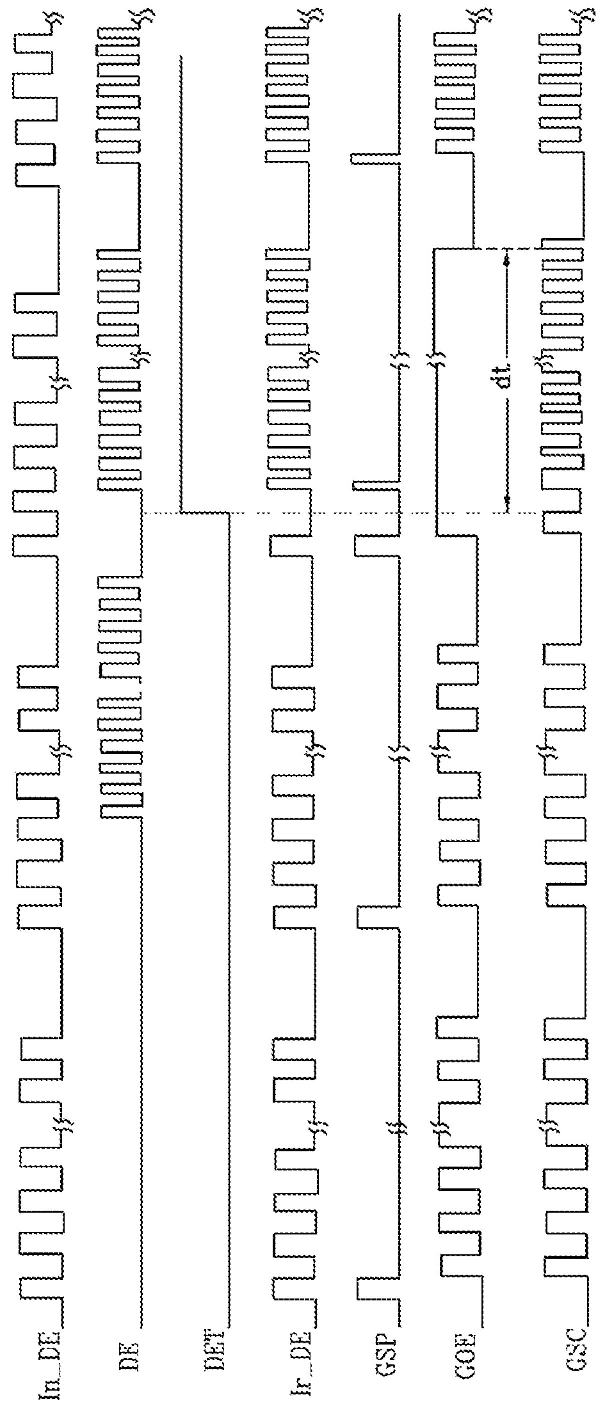
FIG. 4 is an input/output waviness of the timing controller to explain a method for driving the liquid crystal display device according to an exemplary embodiment of the present invention.

FIG. 4 illustrates an input/output waviness of the timing controller to explain a method for driving the liquid crystal display device according to the present invention.

As shown in FIG. 4, when the external power is input, the internal signal generating unit 18 generates an internal enable signal (In_DE) in itself, by using the external power. When at least one of external synchronization signals (DET) (DCLK, Hsync, Vsync and DE), for example, a data enable signal (DE) starts to be input, a switching signal (DET) for noticing the input of the synchronization signals (DCLK, Hsync, Vsync and DE) is generated by the internal signal generating unit 18. At this time, the switching signals (DET), together with the synchronization signals input from the outside, are supplied to the gate and data control signal generating units 14 and 16, respectively.

Internal enable signals (In_DE) shown as input enable signals (Ir_DE) are supplied to the gate and data control signal generating units 14 and 16 in the initial driving where the external power is input. However, once data enable signals (DE) start to be input from the outside, the data enable signals (DE) are supplied to the gate and data control signal generating units 14 and 16, respectively, together with switching signals (DET). Because of that, the gate and data control signal generating units 14 and 16, especially, the gate control signal generating unit 14 may generate the initial gate control signal (GCS') based on the internal enable signal (In_DE) in the initial driving. Hence, when at least one synchronization signals (DCLK, Vsync, Hsync and DE), such as the data enable signals (DE), start to be input from the outside, the gate control signal generating unit 14 generates/outputs a GOE signal, with maintaining the GOE signal high or low for one frame period, to make the gate driver 6 not output gate-on voltages for one frame period. Even when GSP is generated by the data enable signal (DE) before at least one frame period ends after GSP' is generated by the gate driver 6 based on the internal enable signal (In_DE), image signals transmitted by the data enable signal (DE) may not be displayed on the liquid crystal panel 2. In other words, only image signals transmitted by initial gate and data control signals (GCS' and DCS') of the former frame may be displayed on the liquid crystal panel 2.

In the meanwhile, in the initial driving where the external power is input, the gate control signal generating unit 14 is generating/outputting initial gate control signals (GCS') based on the internal enable signal (In_DE). When at least one of the synchronization signals (DCLK, Hsync, Vsync and DE) starts to be input from the outside, a switching signal (DET) for noticing the input of the synchronization signals (DCLK, Hsync, Vsync and DE) is generated by the internal signal generating unit 18. The switching signal (DET) together with the synchronization signals input from the outside, are supplied to the gate control signal generating unit 16. Then, the gate control signal generating unit 14 generates/outputs the GOE signals based on the external data enable signal (DE), with maintaining them high and low for one frame period, to make the gate driver 6 not output gate-on voltages for one frame period. Because of that, even when GSP is generated based on the data enable signal (DE) before at least one frame ends after GSP is generated in the gate driver 6 based on the internal enable signal (In_DE), image signals transmitted from the data enable signals (DE) may not be displayed on the liquid crystal panel 2. That is, only image signals transmitted from initial and gate and data control signals (GCS' and DCS') of the former frame may be displayed on the liquid crystal panel 2.

Therefore, according to the driving circuit of the liquid crystal display device and the method for driving the same according to the embodiments of the present invention, when the images based on the self-generated-enable-signal converts into images based on the external synchronization signals to display the images based on the external synchronization signals while displaying the images based on the self-generated-enable-signal, it is possible to prevent the start-signal for noticing a start of every frame from being duplicated, and thus prevents the problem that a single image is dupliatedly displayed on a single screen. In this way, reliability of the liquid crystal display device may be enhanced more remarkably.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A driving circuit for a liquid crystal display device, comprising:

a liquid crystal panel comprising a plurality of pixel areas to display an image;

a data driver configured to drive data lines of the liquid crystal panel;

a gate driver configured to drive gate lines of the liquid crystal panel; and a timing controller configured to generate an internal enable signal in an initial driving where an external power is applied and at least one synchronization signal is not input from outside, generate first gate and data control signals (GCS' and DCS'), using the internal enable signal, and output the first gate and data control signals to the gate and data drivers, and configured to generate second gate and data control signals (GCS and DCS) using the at least one synchronization signal when the at least one synchronization signal is input from outside, and output the second gate and data control signals (GCS and DCS) to the gate and data drivers, wherein the second gate control signal makes the gate driver not output gate-on voltages for one frame period when the at least one synchronization signal is input from outside, wherein the timing controller further comprises an internal signal generating unit configured to generate the internal enable signal in itself in the initial driving where the at least one synchronization signal is not input from outside, and wherein the first data control signal (DCS') includes a signal that varies between a high level and a low level.

2. The driving circuit for the liquid crystal display device of claim 1, wherein the timing controller further comprises:

an image processing unit configured to supply arranged image data to the data driver by arranging image data based on at least one of the internal enable signal and the at least one synchronization signal;

a data control signal generating unit configured to generate the first data control signal based on the internal enable signal, and configured to generate the second data control signal based on the at least one synchronization signal when the at least one synchronization signal is input from the outside;

a gate control signal generating unit configured to generate the first gate control signal using the internal enable signal and the second gate control signal based on the at least one synchronization signal when the at least one synchronization signal is input, to make the gate driver not output gate-on voltages for one frame period, after generating the first gate control signal to sequentially supply gate-on voltages to each of the gate lines based on the first gate control signal.

3. The driving circuit for the liquid crystal display device of claim 2, wherein the second gate control signal includes a gate output enable signal maintaining high or low for one frame period, to make the gate driver not output the gate-on voltages for one frame period.

4. The driving circuit for the liquid crystal display device of claim 3, wherein the internal signal generating unit generates a switching signal for noticing the input of the at least one synchronization signal, and supplies the switching signal to the gate control signal generating unit, together with the at least one synchronization signal, and then the gate control signal generating unit generates the second gate control signal.

5. A method for driving a liquid crystal display device, the method comprising:

generating an internal enable signal in an initial driving where an external power is applied and at least one synchronization signal is not input from outside;

generating first gate and data control signals (GCS' and DCS') using the internal enable signal, and outputting the first gate and data control signals to gate and data drivers, wherein the first data control signal (DCS') includes a signal that varies between a high level and a low level;

generating second gate and data control signals (GCS and DCS) using the at least one synchronization signal when the at least one synchronization signal is input from outside, and outputting the second gate and data control signals to the gate and data drivers, driving data lines of a liquid crystal panel by the data driver based on the first and second data control signals;

driving gate lines of the liquid crystal panel by the gate driver based on the first and second data control signals, wherein the second gate control signal makes the gate driver not output gate-on voltages for one frame period when the at least one synchronization signal is input from outside.

6. The method for driving the liquid crystal display device of claim 5, further comprising:

supplying the arranged image data to the data driver by arranging image data based on at least one of the internal enable signal and the at least one synchronization signal.

7. The method for driving the liquid crystal display device of claim 6, wherein the second gate control signal includes a gate output enable signal maintaining high or low for one frame period to make the gate driver not output the gate-on voltages for one frame period.

8. The method for driving the liquid crystal display device of claim 7, further comprising:

generating a switching signal for noticing the input of the at least one synchronization signal; and supplying the switching signal to a gate control signal generating unit, together with the at least one synchronization signal.

* * * * *